(12) United States Patent
Zavesky (10) Patent No.: US 10,580,219 B2
(45) Date of Patent: Mar. 3, 2020

(54) SYSTEM AND METHOD TO DIGITALLY REPLACE OBJECTS IN IMAGES OR VIDEO

(71) Applicant: AT&T INTELLECTUAL PROPERTY I, L.P., Atlanta, GA (US)

(72) Inventor: Eric Zavesky, Hoboken, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/267,649

(22) Filed: Feb. 5, 2019

(65) Prior Publication Data

US 2019/0172268 A1 Jun. 6, 2019

Related U.S. Application Data

(63) Continuation of application No. 15/457,564, filed on Mar. 13, 2017, now Pat. No. 10,249,093, which is a
(Continued)

(51) Int. Cl.
*G06T 19/00* (2011.01)
*H04N 21/81* (2011.01)
(Continued)

(52) U.S. Cl.
CPC ............ *G06T 19/006* (2013.01); *G06T 15/50* (2013.01); *G06T 19/20* (2013.01); *G11B 27/036* (2013.01); *H04N 21/21805* (2013.01); *H04N 21/234318* (2013.01); *H04N 21/4394* (2013.01); *H04N 21/44008* (2013.01); *H04N 21/44012* (2013.01);
(Continued)

(58) Field of Classification Search
None
See application file for complete search history.

(56) References Cited

U.S. PATENT DOCUMENTS 5,467,123 A 11/1995 Zeevi et al.
6,018,768 A 1/2000 Ullman et al.
(Continued)

FOREIGN PATENT DOCUMENTS

WO 2007035558 A2 3/2007

OTHER PUBLICATIONS

"MCEBuddy: Convert, Shrink, and Remove Ads for Your Media Center", Tyrell Pty Ltd, published 2010, retrieved Apr. 13, 2010, <http://mcebuddy.com/>, 1 page.
(Continued)

*Primary Examiner* — Frederick D Bailey
(74) *Attorney, Agent, or Firm* — Guntin & Gust, PLC; Robert Gingher (57) ABSTRACT

A method includes receiving, at a computer system, video data of a video frame of video content. The method includes identifying, at the computer system, a first representation of a first object in the video frame to be replaced with a second representation of a second object based on absence of a visible feature in the first representation. The method includes manipulating, at the computer system, a three-dimensional model of the second object to generate the second representation. The second representation includes the visible feature. The method also includes generating, at the computer system, a modified version of the video frame that includes the second representation in place of the first representation.

20 Claims, 6 Drawing Sheets

Related U.S. Application Data continuation of application No. 13/311,044, filed on Dec. 5, 2011, now Pat. No. 9,626,798.

(51) Int. Cl.

| | | |
|---|---|---|
| H04N 21/2343 | (2011.01) | |
| H04N 21/4402 | (2011.01) | |
| H04N 21/218 | (2011.01) | |
| H04N 21/44 | (2011.01) | |
| H04N 21/439 | (2011.01) | |
| G06T 19/20 | (2011.01) | |
| G11B 27/036 | (2006.01) | |
| G06T 15/50 | (2011.01) | |
| H04N 21/84 | (2011.01) | |

(52) U.S. Cl.
CPC ... *H04N 21/440236* (2013.01); *H04N 21/812* (2013.01); *H04N 21/8146* (2013.01); *H04N 21/84* (2013.01)

(56) References Cited

U.S. PATENT DOCUMENTS

| | | | |
|---|---|---|---|
| 6,304,855 | B1 | 10/2001 | Burke |
| 6,959,099 | B2 | 10/2005 | Gutta et al. |
| 7,120,924 | B1 | 10/2006 | Katcher et al. |
| 7,306,522 | B2 | 12/2007 | Silver et al. |
| 7,334,249 | B1 | 2/2008 | Byers |
| 7,360,234 | B2 | 4/2008 | Robson et al. |
| 7,565,139 | B2 | 7/2009 | Neven, Sr. et al. |
| 7,568,214 | B2 | 7/2009 | Leak et al. |
| 7,584,491 | B2 | 9/2009 | Bruckner et al. |
| 7,970,235 | B1 | 6/2011 | Bergman et al. |
| 8,615,596 | B1 | 12/2013 | Upadhyay et al. |
| 2002/0024517 | A1 | 2/2002 | Yamaguchi et al. |
| 2002/0052709 | A1 | 5/2002 | Akatsuka et al. |
| 2002/0059644 | A1 | 5/2002 | Andrade et al. |
| 2002/0078443 | A1 | 6/2002 | Gadkari et al. |
| 2002/0112248 | A1 | 8/2002 | Takagi et al. |
| 2002/0122137 | A1 | 9/2002 | Chen et al. |
| 2002/0162118 | A1 | 10/2002 | Levy et al. |
| 2003/0028873 | A1 | 2/2003 | Lemmons |
| 2003/0038822 | A1 | 2/2003 | Raskar |
| 2003/0095705 | A1 | 5/2003 | Weast |
| 2004/0008278 | A1 | 1/2004 | Iggulden et al. |
| 2004/0031062 | A1 | 2/2004 | Lemmons |
| 2004/0257369 | A1 | 12/2004 | Fang |
| 2004/0261096 | A1 | 12/2004 | Matz |
| 2004/0268419 | A1 | 12/2004 | Danker et al. |
| 2005/0026690 | A1 | 2/2005 | Silver et al. |
| 2005/0117798 | A1 | 6/2005 | Patton et al. |
| 2005/0120391 | A1 | 6/2005 | Haynie et al. |
| 2005/0138674 | A1 | 6/2005 | Howard et al. |
| 2006/0107289 | A1 | 5/2006 | Deyonker et al. |
| 2006/0117343 | A1 | 6/2006 | Novak et al. |
| 2007/0214476 | A1 | 9/2007 | Zalewski et al. |
| 2007/0226761 | A1 | 9/2007 | Zalewski et al. |
| 2007/0269080 | A1 | 11/2007 | Hamanaka |
| 2008/0046920 | A1 | 2/2008 | Bill |
| 2008/0125098 | A1 | 5/2008 | Bruce et al. |
| 2008/0168489 | A1 | 7/2008 | Schraga |
| 2008/0201369 | A1 | 8/2008 | Cordoba |
| 2008/0254740 | A1 | 10/2008 | Tofigh et al. |
| 2009/0041311 | A1 | 2/2009 | Hundley |
| 2009/0141940 | A1 | 6/2009 | Zhao et al. |
| 2009/0249393 | A1 | 10/2009 | Shelton et al. |
| 2009/0279784 | A1 | 11/2009 | Arcas et al. |
| 2010/0027961 | A1 | 2/2010 | Gentile et al. |
| 2010/0058405 | A1 | 3/2010 | Ramakrishnan et al. |
| 2010/0107187 | A1 | 4/2010 | Krantz et al. |
| 2010/0118119 | A1 | 5/2010 | Newton et al. |
| 2010/0122286 | A1 | 5/2010 | Begeja et al. |
| 2010/0195913 | A1 | 8/2010 | Sharma et al. |
| 2011/0063415 | A1 | 3/2011 | Gefen et al. |
| 2011/0119709 | A1 | 5/2011 | Kim et al. |
| 2011/0137753 | A1 | 6/2011 | Moehrle |
| 2011/0157170 | A1 | 6/2011 | Bennett et al. |
| 2011/0161843 | A1 | 6/2011 | Bennett et al. |
| 2011/0169913 | A1 | 7/2011 | Karaoguz et al. |
| 2011/0321082 | A1 | 12/2011 | Weerasinghe |
| 2012/0023543 | A1 | 1/2012 | Shelton et al. |
| 2012/0086772 | A1 | 4/2012 | Shintani et al. |
| 2012/0140025 | A1 | 6/2012 | Friedman |
| 2012/0140048 | A1 | 6/2012 | Levine |
| 2012/0287233 | A1 | 11/2012 | Wang et al. |
| 2012/0310791 | A1 | 12/2012 | Weerasinghe |
| 2012/0314030 | A1 | 12/2012 | Datta et al. |
| 2013/0073619 | A1* | 3/2013 | Tumuluri ............... G06T 19/20 709/204 |
| 2013/0141530 | A1 | 6/2013 | Zavesky |
| 2014/0015832 | A1 | 1/2014 | Kozko et al. |

OTHER PUBLICATIONS

Cheng, Y., et al., "3-D-Model-based Face Replacement in Video", Proceedings SIGGRAPH 2009, Article No. 29, 2009, ACM, New York, NY, 1 page.

Hybrid Broadcast Broadband TV (HbbTV), retrieved Apr. 13, 2010, <http://www.hbbtv.org/>, 1 page.

"Custom Object Recognition Software Development", Dynamic Ventures, retrieved Apr. 13, 2010, <http://imagegraphicsvideo.com/ms/001/ObjectRecognition.html>, 2 pages.

"Face Tracking", 2004-2010 Pittsburgh Pattern Recognition, Inc., retrieved Apr. 13, 2010, <http://www.pittpatt.com/face_tracking/>, 2 pages.

"Image Recognition Software Breakthrough", ScienceDaily, published Jan. 23, 2009, <http://www.sciencedaily.com-/releases/2009/01/090108082912.htm>, 2 pages.

"SnapStream Beyond TV: PC DVR software", Snapstream Media, Inc., retrieved Apr. 13, 2010, <http://www.snapstream.com/products/beyondtv/>, 2 pages.

Bitouk, D. et al., "Face Swapping: Automatically Replacing Faces in Photographs," CAVE Projects, Retrieved from <http://www1.cs.columbia.edu/CAVE/projects/face_replace/>, Retrieved on Apr. 12, 2010, 3 pages.

Lee, K. et al., "Detecting Music in Ambient Audio by Long-Window Autocorrelation", Proceedings of the IEEE International Conference on Acoustics, Speech, and Signal Processing, ICASSP 2008, Apr. 2008, IEEE, Piscataway, NJ, 4 pages.

"List of Video Editing Software—Wikipedia, the free encyclopedia", Wikipedia.org, retrieved Apr. 13, 2009, <http://en.wikipedia.org/wiki/List_of_video_editing_software>, 5 pages.

Hachman, M., "Hands Off with Google Goggles", PCMag.com, published Dec. 8, 2009, <http://www.pcmag.com/article2/0,2817,2356786,00.asp>, 5 pages.

International Preliminary Report on Patentability for International Application No. PCT/US12/66797, dated Jun. 10, 2014, 5 pages.

O'Dell, J., "Machine Vision on the Horizon: Vitamin D Launches Object Recognition for Video", ReadWriteWeb, published Sep. 23, 2009, <http://www.readwriteweb.com/readwritestart/2009/09/vitamin-d-video.php>, 5 pages.

Eldon, E., "Yahoo buying Maven Networks, to serve online video ads for big media", VentureBeat, published Jan. 31, 2008, <http://venturebeat.com/2008/01/31/yahoo-buying-maven-networks-to-serve-online-video-ads-for-big-media>, 6 pages.

"PG-13 ain't what is used to be", Blogcritics.org, published Jul. 16, 2004, <http://www.blogcritics.org/video/article/pg-13-aint-what-is-used/>, 7 pages.

Wildstrom, S., "Supreme Court: Cablevision Remote DVR is OK", Business Week, published Jun. 29, 2009, <http://www.businessweek.com/the_thread/techbeat/archives/2009/06/supreme_court_c.html>, 8 pages.

Kenny, L. et al., "LSCOM Lexicon Definitions and Annotations (Version 1.0)", DTO Challenge Workshop on Large Scale Concept Ontology for Multimedia, Columbia University ADVENT Technical Report #217-2006-3, Mar. 2006, 88 pages.

(56) References Cited

OTHER PUBLICATIONS

Avidan, S., et al., "Seam Carving for Content-Aware Image Resizing", SIGGRAPH '07, ACM SIGGRAPH 2007, vol. 26, Issue 3, Article No. 10, Jul. 2007, ACM, New York, 9 pages.
International Search Report and Written Opinion of the International Searching Authority, International Application No. PCT/US2012/066797, European Patent Office, dated Apr. 17, 2014, 9 pages.
Goldman, D. et al., "Shape and Spatially-Varying BRDFs From Photometric Stereo", IEEE Transactions on Pattern Analysis and Machine Intelligence, vol. 32, Issue 6, Jun. 2010, IEEE Computer Society, pp. 1060-1071.
Petrovic, V. et al., "Automated Analysis of Deformable Structures in Groups of Images", BMVC 2007, In Proceedings of the British Machine Vision Conference 2007, Sep. 2007, pp. 1-10.
Zhou, C. et al., "Depth from Diffusion", 2010 IEEE Conference on Computer Vision and Pattern Recognition (CVPR), Jun. 2010, IEEE, pp. 1110-1117.
Lowe, D., "Object Recognition from Local Scale-Invariant Features", Proceedings of the Seventh IEEE International Conference on Computer Vision, vol. 2, Sep. 1999, pp. 1150-1157.
Zhang, L. et al., "Rapid Shape Acquisition Using Color Structured Light and Multi-pass Dynamic Programming", Proceedings First International Symposium on 3D Data Processing Visualization and Transmission, 2002, IEEE, pp. 24-36.
Chuang, Y. et al., "A Bayesian Approach to Digital Matting", Proceedings of IEEE Computer Vision and Pattern Recognition 2001, vol. II, Dec. 2001, pp. 264-271.
Zhou, C. et al., "Coded Aperture Pairs for Depth from Defocus", 2009 IEEE 12th International Conference on Computer Vision, Oct. 2009, IEEE, pp. 325-332.
Kennedy, L. et al., "Internet Image Archaeology: Automatically Tracing the Manipulation History of Photographs on the Web", MM '08, Proceedings of the 16th ACM International Conference on Multimedia, ACM, New York, NY, pp. 349-358.
Koenderink, J. et al., "Affine Structure from Motion", Journal of the Optical Society of America, Feb. 1991, vol. 8, No. 2, pp. 377-385.
Stricker, M. et al., "Similarity of Color Images", IS&T/SPIE's Symposium on Electronic Imaging: Science & Technology, International Society for Optics and Photonics, Mar. 1995, pp. 381-392.
Bay, H., et al., "SURF: Speeded up Robust Features", Computer Vision—ECCV 2006, 2006, Springer Berlin Heidelberg, pp. 404-417.
Rosten, E. et al., "Machine Learning for High-Speed Corner Detection", ECCV '06, Proceedings of the 9th European Conference on Computer Vision, vol. 1, 2006, Springer-Verlag, pp. 430-443.
Daum, M. et al., "On 3-D Surface Reconstruction Using Shape from Shadows", Proceedings 1998 IEEE Computer Society Conference on Computer Vision and Pattern Recognition, Jun. 1998, pp. 461-468.
Jeong, C. et al, "Appearance-Based Nude Image Detection," ICPR 2004, Proceedings of the 17th International Conference on Pattern Recognition, vol. 4, Aug. 2004, IEEE, pp. 467-470.
Chuang, Y. et al., "Shadow Matting and Compositing", Proceedings of ACM SIGGRAPH 2003, vol. 22, No. 3, Jul. 2003, pp. 494-500.
Liu, Z. et al., "AT&T Research at TRECVID 2010", In Proceedings TRECVID Workshop 2011, 2011, AT&T Labs Research, pp. 5-7.
Huang, J. et al., "Image Indexing Using Color Correlograms", Proceedings 1997 IEEE Computer Society Conference on Computer Vision and Pattern Recognition, Jun. 1997, IEEE, pp. 762-768.
Tola, E. et al., "DAISY: An Efficient Dense Descriptor Applied to Wide-Baseline Stereo", IEEE Transactions on Pattern Analysis and Machine Intelligence, vol. 32, Issue 5, Apr. 2009, IEEE Computer Society, pp. 815-830.
Snavely, N. et al., "Photo Tourism: Exploring Photo Collections in 3D", ACM Transactions on Graphics (TOG)—Proceedings of ACM SIGGRAPH 2006, vol. 25, Issue 3, Jul. 2006, ACM, New York, NY, pp. 835-846.
Ebrahimi, M. et al., "SUSurE: Speeded Up Surround Extrema Feature Detector and Descriptor for Realtime Applications", CVPR Workshops 2009, IEEE Computer Society Conference on Computer Vision and Pattern Recognition Workshops, Jun. 2009, IEEE, pp. 9-14.
Ojala, T. et al., "Multiresolution Gray-Scale and Rotation Invariant Texture Classification with Local Binary Patterns", IEEE Transactions on Pattern Analysis and Machine Intelligence, vol. 24, Issue 7, Jul. 2002, pp. 971-987.
Ogle, J. et al., "Fingerprinting to Identify Repeated Sound Events in Long-Duration Personal Audio Recordings", ICASSP 2007, IEEE International Conference on Acoustics, Speech and Signal Processing, Apr. 2007, IEEE, pp. I-233-I-236.
Criminisi, A. et al., "Object Removal by Exemplar-Based Inpainting", Proceedings of IEEE Computer Vision and Pattern Recognition, vol. 2, Jun. 2003, IEEE, pp. II-721-II-728.

\* cited by examiner

Object Detection Process Flow

FIG. 3

Object Replacement Process Flow

SYSTEM AND METHOD TO DIGITALLY REPLACE OBJECTS IN IMAGES OR VIDEO

PRIORITY CLAIM

This application claims priority from, and is a continuation of, U.S. patent application Ser. No. 15/457,564, filed on Mar. 13, 2017, which is a continuation of U.S. patent application Ser. No. 13/311,044, filed on Dec. 5, 2011, issued as U.S. Pat. No. 9,626,798, each of which is incorporated herein by reference in its entirety.

FIELD OF THE DISCLOSURE

The present disclosure is generally related to systems and methods to digitally replace objects in images or video.

BACKGROUND

As consumers are increasingly able to skip advertising segments (i.e., "commercials") in video content, advertisers and content producers are seeking alternatives to the traditional commercial segment to advertise products. For example, a user may fast forward through commercials in a television (TV) show or engage in other activities (e.g., take a bathroom break) for the duration of commercials. When consumers knowingly avoid commercials in video content, it becomes more difficult for content producers/providers to promote the advantages of advertising products. Product placement within programs or other content may be used to advertise products outside the traditional commercial segment. However, product placement can add delays in production and can lead to costly reshoots.

In certain situations, even after the advertisers and content providers have agreed on product placement campaigns (i.e., commercials) and costs, viewing demographics may sometimes change by the air date of a program in which the commercial is to be placed. In such cases, advertisers and content providers may need to reshoot the commercial or accept the smaller viewership. Further, the product originally shot may have changed (e.g., different cereal box design, or container design, etc) and the advertiser may continue with the old product design in the commercial or may incur costs for a new commercial that includes the new product design. Moreover, advertisers and content providers may wish to use a single commercial to place products that best match a viewing demographic (e.g., a soda bottle in Mexico and a soda can in the U.S.) without having to produce or pay for multiple commercials with different types of the same product (i.e., bottle and can).

DETAILED DESCRIPTION

Systems and methods to digitally replace objects in images or video are disclosed. The disclosed systems and methods may enable dynamic and seamless replacement of objects (e.g., consumer products) in an image or video stream. For example, the disclosed systems and methods may enable targeted product(s) captured during production to be swapped with replacement product(s) that meet advertising goals in an automated manner. The disclosed systems and methods may also enable object replacement based on context rules. For example, during post-production of video content, the disclosed systems and methods may be utilized to automatically validate that all instances of a product (e.g., a soda can) abide by a rule established by a company's marketing organization (e.g., the soda can must have its label face forward and entirely visible to a camera) by replacing instances of the product that do not meet this rule. Thus, the system may correctly re-light, reposition, and re-orient instances of the product so that the label is forward facing.

Further, the disclosed systems and methods may accommodate consumer-quality media (e.g., social media from mobile devices, video from an event, and user-generated video) as candidates for object replacement. For example, a consumer entertainment application may utilize the disclosed systems and methods for replacement of faces, bodies, clothing, etc., based on a consumer's personal photo collection. The disclosed systems and methods may also be utilized in security and surveillance applications to replace unknown or unapproved faces, products, or objects with generic placeholders. For example, an object representation database may include faces, products, and objects that have not been approved for release or that need to be prevented from display. When the disclosed system is executed, context rules may identify that the particular faces, products, or objects are to be replaced with placeholders. Thus, the system may automatically determine when the particular face, products, or objects should be replaced in an image or video.

In a particular embodiment, a method includes receiving video data and identifying a second object in at least one video frame of the video data. The method also includes determining whether to replace the second object in the at least one video frame with a first object based on at least one object matching rule. In response to determining that the second object is to be replaced with the first object, the method includes manipulating a three-dimensional model of the first object to generate a representation of the first object that matches at least one visual property of the second object and replacing the second object with the representation of the first object in the at least one video frame.

In another embodiment, a system includes a memory and a processor coupled to the memory. The processor is configured to identify a second object in at least one video frame of video data and to determine whether to replace the second object in the at least one video frame with a first object based on at least one object matching rule. In response to determining that the second object is to be replaced with the first object, the processor is configured to manipulate a three-dimensional model of the first object to generate a representation of the first object that matches at least one visual property of the second object and to replace the second object with the representation of the first object in the at least one video frame.

In yet another embodiment, a computer-readable storage medium includes instructions that, when executed by a processor, cause the processor to identify a second object in at least one video frame of video data and to determine whether to replace the second object in the at least one video frame with a first object based on at least one object matching rule. The computer-readable storage medium further includes instructions that, when executed by the processor, cause the processor to manipulate a three-dimensional model of the first object to generate a representation of the first object that matches at least one visual property of the second object and to replace the second object with the representation of the first object in the at least one video frame, in response to determining that the second object is to be replaced with the first object.

Figure 1:
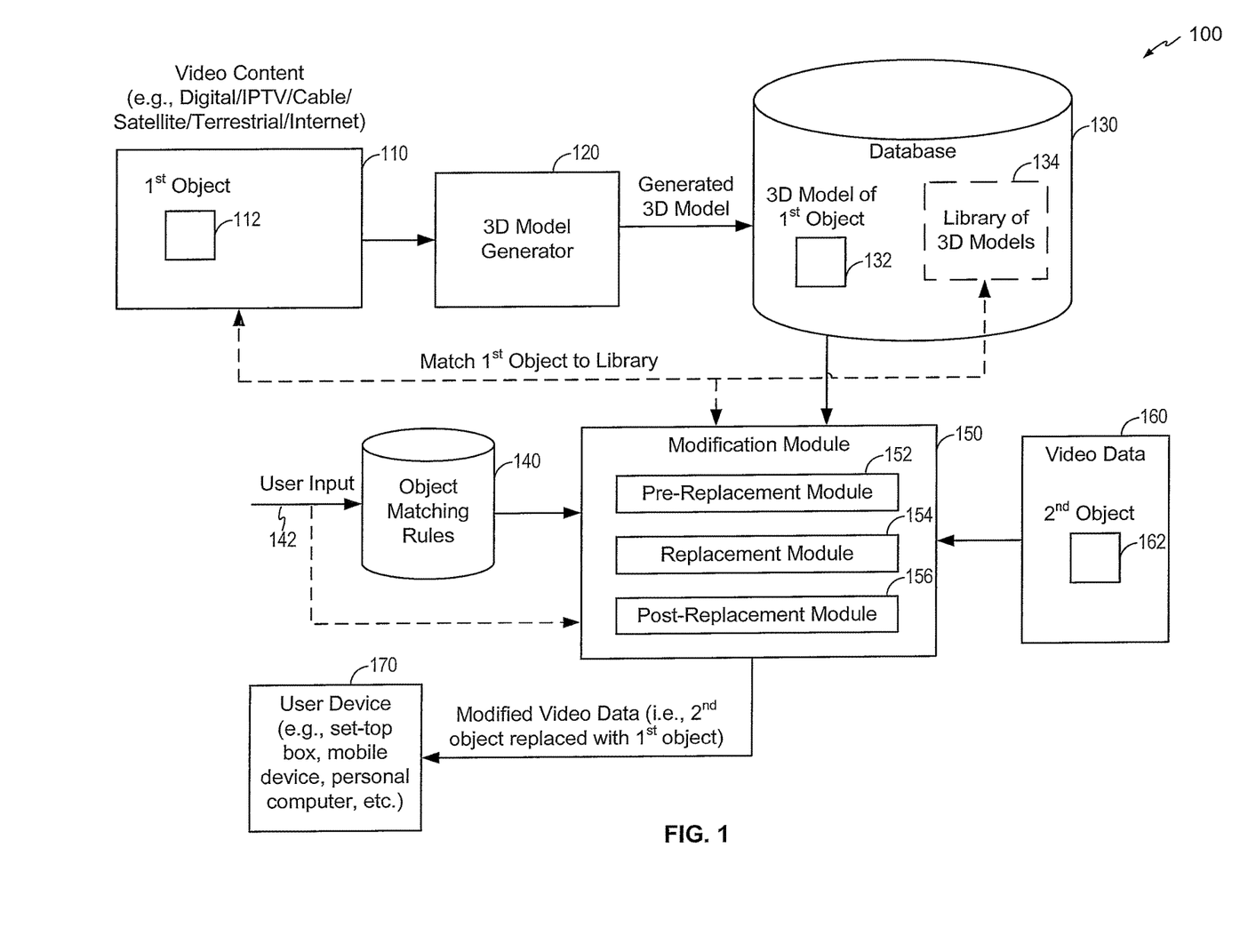
FIG. 1 is a block diagram of an illustrative embodiment of a system to digitally replace objects in images or video.

Referring to FIG. 1, a particular illustrative embodiment of a system to digitally replace objects in images or video is disclosed and generally designated 100. The system 100 includes a three-dimensional (3D) model generator 120 coupled to a database 130. The 3D model generator 120 may be configured to generate a 3D model of an object (e.g., representative first object 112) depicted in video content 110 and to store the generated 3D model 132 of the first object 112 in the database 130. The database 130 may also include a library 134 of 3D models generated for a plurality of objects. The library 134 of 3D models may be categorized and organized based on visual properties of the objects, scene or background data surrounding the objects, other information descriptive of the objects, or a combination thereof.

In a particular embodiment, the database 130 may be coupled to a modification module 150. The modification module 150 may be coupled to, integral with, or may be in communication with a user device 170. For example, the user device 170 may include a set-top box, a mobile device, a television, a video recording device (e.g., digital video recorder, digital versatile disc player, Blu-ray® media player), a personal computing device, a mobile computing device, or any combination thereof. The modification module 150 may include a pre-replacement module 152, a replacement module 154, and a post-replacement module 156. The modification module 150 may include or may be coupled to a database 140 of object matching rules. The modification module 150, the pre-replacement module 152, the replacement module 154, and the post-replacement module 156 may be implemented as instructions executable by a processor, application specific integrated circuits (ASICs), other special circuitry, or any combination thereof.

During operation, the 3D model generator 120 may receive video content 110 that depicts (or includes) the first object 112 (e.g., a replacement object). In a particular embodiment, the video content 110 may be received from a plurality of video content sources. For example, the video content sources may include a digital source, an internet protocol television (IPTV) source (e.g., a source configured to deliver media content via proprietary/private network), a cable television source, a satellite television source, a terrestrial television content (e.g., "over the air" television) source, a mobile television content source (e.g., a source configured to deliver television content via the public internet), or any combination thereof. The video content 110 may be represented by a common video format (e.g., Motion Picture Experts Group (MPEG)) or by different video formats. In a particular embodiment, the video content 110 may include automatically crawled content. For example, the video content 110 may be automatically retrieved from internet sites (e.g., social network sites) or from a memory of a user device (e.g., images/video/pictures from a mobile device, a personal computer, or a digital camera/video recorder). Further, the video content 110 may include graphics files, video files, still images, or any combination thereof.

In a particular embodiment, the 3D model generator 120 may generate a 3D model of the first object 112 depicted in the video content 110 and store the generated 3D model 132 in the database 130. The database 130 may include a memory device configured to store 3D models of objects. The database 130 may also include a library 134 of previously generated 3D models of a plurality of objects. The library 134 of 3D models may be cataloged and categorized based on object size, type, shape, color, texture, visual or audio context, lighting conditions, other information descriptive of the objects, or any combination thereof. In an alternate embodiment, the 3D model 132 of the first object 112 may be determined by matching the first object 112 depicted in the video content 110 with a corresponding 3D model 132 from the library 134 of 3D models. Thus, a 3D model 132 may be generated for the first object 112 in the video content 110 if the 3D model 132 does not exist in the database 130, or the 3D model 132 corresponding to the first object 112 may be extracted from the database 130. In both instances, the 3D model 132 may be augmented automatically to include the first object 112 and all of its properties (i.e., size, type, shape, color, texture, lighting, etc) and the context of the first object 112 such that the library 134 of 3D models contains information from every first object 112 correctly identified from every video content 110 processed by the system 100.

Video data 160 depicting a second object 162 (e.g., a target object) may be provided to the modification module 150 for processing. In a particular embodiment, the video data 160 may be received from a plurality of video content sources. For example, the video content sources may include a digital source, an internet protocol television (IPTV) source (e.g., a source configured to deliver media content via proprietary/private network), a cable television source, a satellite television source, a terrestrial television content (e.g., "over the air" television) source, a mobile television content source (e.g., a source configured to deliver television content via the public internet), or any combination thereof. The video data 160 may be represented by a common video format (e.g., Motion Picture Experts Group (MPEG)) or by different video formats. In a particular embodiment, the video data 160 may include automatically crawled content. For example, the video data 160 may be automatically retrieved from internet sites (e.g., social network sites) or from a memory of a user device (e.g., images/video/pictures from a mobile device, a personal computer, or a digital camera/video recorder). Further, the video data 160 may include graphics files, video files, still images, or any combination thereof. The second object 162 may be identified in the video data 160 as a replacement object using the same methods for 3D model generation by the 3D model generator 120 and the database 130 containing a library 134 of 3D models. For example, it may be desirable to replace the second object 162 in the video data 160 with the first object 112. To illustrate, the second object 162 may be a Railway brand of cup that is to be replaced with the first object 112 (e.g., a Bionic brand of cup). In this example, a content (e.g., commercial) producer may want to replace the Railway cup in the video data 160 (e.g., the commercial) with the Bionic cup that is stored in the database 130 or provided by an advertiser (e.g., a marketing department of Bionic). In the example above, it should be noted that the database 130 may be generated from video content provided by the advertiser.

In a particular embodiment, at least one object matching rule (e.g., contextual rule) may be provided to the modification module 150 when determining whether to replace the second object 162 with the first object 112 in the video data 160. The at least one object matching rule may be provided from the database 140 of object matching rules. Alternately, the at least one object matching rule may be directly provided by a user (e.g., a content producer or an advertiser). In a particular embodiment, the at least one object matching rule may specify a threshold number of matching features of the first object 112 and the second object 162, a user defined set of matching rules, one or more context rules, or any combination thereof. For example, the at least one object matching rule may specify that the second object 162 is to be replaced with the first object 112 if the second object 162 matches at least three visual or physical properties of the first object 112 (e.g., length, width, and height).

In a particular embodiment, the one or more context rules may specify audio criteria, visual criteria, lighting criteria, texture criteria, geometric criteria, or any combination thereof. For example, the one or more context rules may specify that the second object 162 (e.g., a Railway can) is to be replaced with the first object 112 (e.g., a Bionic can) whenever a drink is mentioned (i.e., audio criteria) in the video data 160, whenever a can is displayed (i.e., visual criteria) in the video data 160, or a combination thereof. In another particular embodiment, the one or more context rules may specify that the second object 162 is not to be replaced with the first object 112 when a particular third object is present in the video data 160. For example, the one or more context rule may specify that the second object 162 (e.g., the Railway cup) may not be replaced with the first object 112 (e.g., the Bionic cup) when a third object (e.g., a Railway sandwich wrapper) is present in the video data 160. Such a context rule may be provided to prevent displaying competing products in the same video data 160, for example. It should be noted that the replacement object (i.e., the first object 112) may be an alternate visual representation of the first object 112 generated from the 3D model 132 of the first object 112, as discussed in further detail below.

In response to determining that the second object 162 is to be replaced with the first object 112, the modification module 150 may manipulate the 3D model 132 of the first object to generate a representation of the first object 112 that matches at least one visual property of the second object 162 and replace the second object 162 with the representation of the first object in the video data 160. In particular, the pre-replacement module 152 of the modification module 150 may be configured to receive the 3D model 132 of the first object 112 from the database 130 and manipulate the 3D model 132 to generate a representation of the first object 112 that matches at least one visual property of the second object 162.

In a particular embodiment, the at least one visual property of the second object 162 may include color, size, shape, texture, lighting, shading, bi-directional reflectance distribution function (BRDF), orientation, topology, or any combination thereof. For example, the video data 160 (e.g., a commercial) may include a Railway can held by consumers, where the Railway logo is obfuscated or occluded (i.e., does not face the camera) by actors' hands. In this example, a content producer may utilize the system 100 to perform post-production editing to show the Railway logo in the commercial without costs associated with reshooting the commercial. This may be achieved by utilizing an existing (or generating) 3D model of the Railway can having the logo facing the camera. The 3D model may have a larger size, orientation, rotation, BRDF, and lightning than the Railway can in the commercial. However, the pre-replacement module 152 may manipulate the 3D model to generate a representation of the Railway can in the commercial, for example, by adjusting the size of the 3D model, lighting properties, rotation, or any combination thereof.

After generating the representation of the first object 112 that matches the at least one visual property of the second object 162, the second object 162 may be replaced with the representation of the first object 112 in the video data 160. For example, the replacement module 154 of the modification module 150 may be configured to replace the second object 162 with the representation of the first object 112 in the video data 160. In a particular embodiment, replacement of the second object 162 with the representation of the first object 112 includes removal of the second object 162 and insertion of the representation of the first object 112 in the video data 160. It should be noted that the video data 160 may include a plurality of video frames and the replacement may be performed to replace the second object 162 with the first object 112 in at least one video frame of the video data 160.

In a particular embodiment, the post-replacement module 156 of the modification module 150 may be configured to automatically perform pixel hallucination for missing pixels resulting from the replacement of the second object 162 with the representation of the first object 112. To illustrate, if the second object 162 in the video data 160 includes more pixels than the generated representation of the first object 112, there may be missing pixels when the representation of the first object 112 replaces the second object 162. The post-replacement module 156 may insert replacement pixels into the video data 160 resulting in smooth and well blended video data 160. Upon completion of the pixel hallucination by the post-replacement module 156, modified video data including the representation of the first object 112 may be sent to the user device 170 for display.

Figure 2:
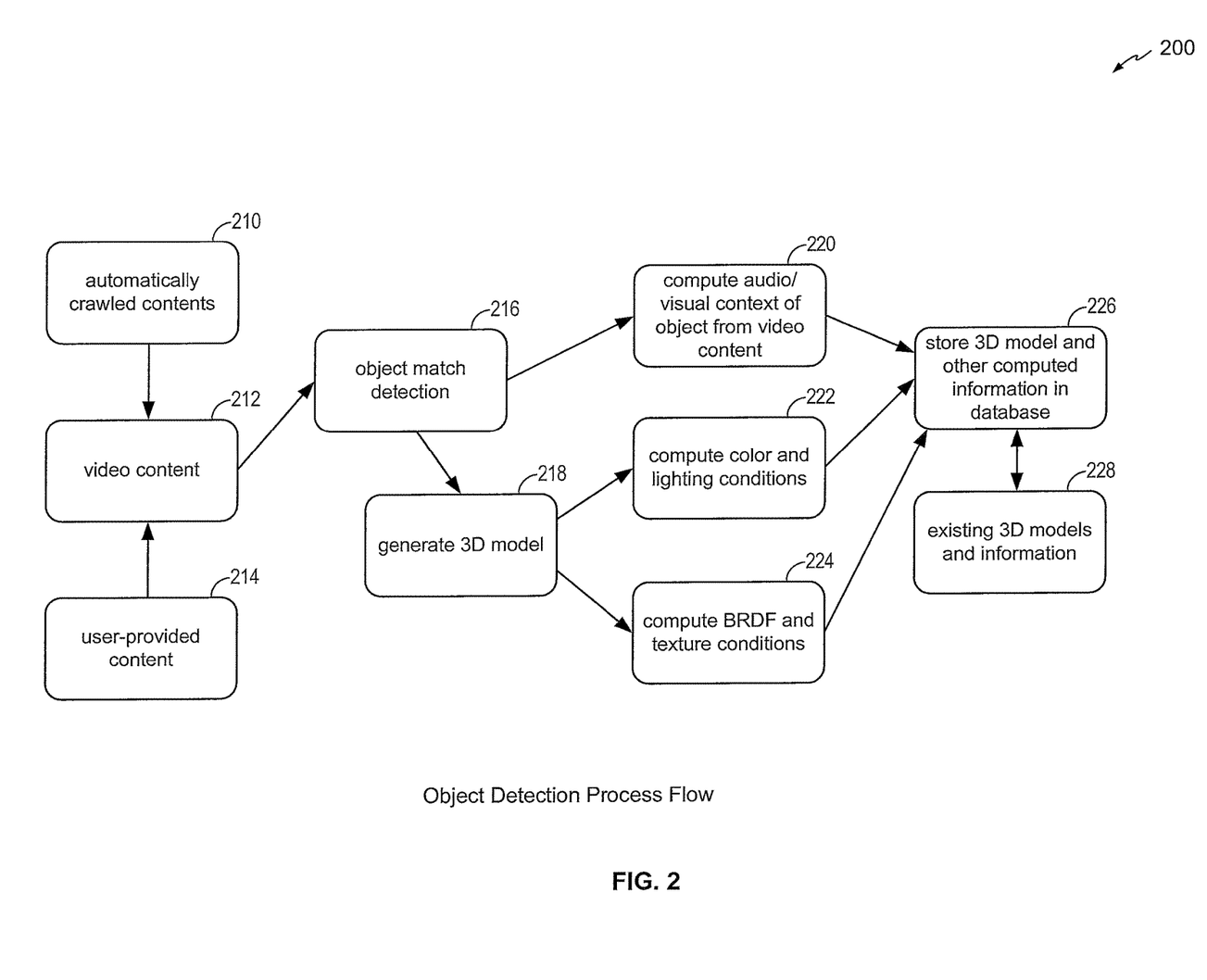
FIG. 2 is an object detection process flow diagram of a method of operation of the system of FIG. 1 according to a particular embodiment.

Referring to FIG. 2, an object detection process flow diagram of a method of operation of the system of FIG. 1 according to a particular embodiment is shown and generally designated 200. Video content 212 may include automatically crawled contents 210, user-provided content 214, graphics files, other content, or a combination thereof. For example, the automatically crawled contents 210 may include images and video retrieved from the internet (social network sites, search engines, file sharing sites, or repositories that store video content) and the user-provided content may include images and video from a user device (e.g., a digital camera/camcorder, a mobile device, a smart phone, or a personal computer) or a subset of automatically crawled contents 210 that have been approved or deliberately selected by user actions (e.g., contents produced by a product's marketing agency).

The video content 212 may be provided to an object match detection process 216 to determine if one or more objects depicted in the video content 212 match objects in a library of existing object models (e.g., the library 134 of FIG. 1). To illustrate, the object match detection process 216 may determine that an object depicted in the video content 212 corresponds to an object modeled by a 3D model stored in the database based on image and video features of the object depicted in the video content 212, such as color, size, shape, or any combination thereof. Further, the object match detection process 216 may implement algorithms to determine the match. In a particular embodiment, the algorithms may be tuned to reduce false matches and/or to improve matching accuracy. For example, a highly secure embodiment (e.g. manipulating content provider streams) may prefer no false matches that replaces only objects that are guaranteed to match, whereas another embodiment that replaces potentially objectionable objects (e.g. a surveillance filter) may permit some false matches in exchange for no missed object instances.

The process 200 may also include computing audio and visual context 220 of the object depicted in the video content 212. For example, the audio context may be computed by using speech recognition methods to extract transcripts in the video content 212, by audio genre classification of musical tracks in the video content 212, or by audio classification of atmospheric or event sounds in the video content 212. The visual context may be computed to detect additional objects in a scene of the video content 212 that includes a target object (i.e., the object of interest depicted in the video content 212). To illustrate, in a picnic scene including a soda can (i.e., the target object), other objects such as trees, a basket, and a table may be identified in the video content 212. By automatically computing audio and visual context 220, the system 100 may statistically learn context of original objects. For example, the system 100 may learn that soda cans are not underwater based on one or more of the above picnic scenes and other scenes depicting soda cans on land.

The process 200 may also include generating a 3D model 218 of the object depicted in the video content 212. For example, the 3D model may be generated using still images or using frames of video. In another example, the 3D model may be generated from partial models of the object (e.g., partial models stored in a database), from two-dimensional models of the object, from scene data depicting the object (i.e., from surrounding objects), from multi-view images (e.g., top, bottom, or sides), from motion of the object in a scene or video, or any combination thereof. For example, a 3D model of a cube may be generated from or based on only the sides of the cube but not the top or bottom. To illustrate, two images depicting two sides of the cube may be used to generate the 3D model of the cube having all six sides (e.g., by extrapolating appearance of the other four sides based on the two known sides).

Either concurrently (e.g., simultaneously) with or after generating the 3D model 218 of the object, color and lighting conditions of the object may be computed, at 222. Other optical or visual characteristics of the object may also be computed. For example, a bi-directional reflectance distribution function (BRDF) and texture conditions 224 of the object may be computed. Computing color and lighting conditions 222 of the object may include computing color and typical angle and intensity of lighting conditions that the object may exhibit. Computing BRDF and texture conditions 224 of the object may include determining how light scatters when hitting a point on the surface of the object. Texture conditions may include bumps, lines, or coarseness that appears on a specific instance of the object. Similar to audio and visual context of the object, the color and lighting conditions and the BRDF and texture conditions may be useful to accurately replace an object in a scene.

Computed properties and information on the object (i.e., generated 3D model 218, computed audio and visual context 220, computed color and lighting conditions 222, and computed BRDF and texture conditions 224) may be stored 226 in a database. The stored properties and information may enable the system 100 of FIG. 1 to accurately perform object replacement. For example, the system 100 of FIG. 1 may leverage information stored in the database (e.g., existing objects and corresponding properties) to supplement or augment generating a replacement object (i.e., a second object to replace a target first object). To illustrate, the system 100 of FIG. 1 may have knowledge (i.e., contain an object with particular properties) about objects with handles (e.g., mugs) and objects with lids (e.g., soup containers), but it may not know about (i.e., there are no object in the database with such properties) a thermos (with both a handle and a lid). Using properties/information of known (i.e., stored) similar objects, the system 100 of FIG. 1 may estimate the missing information of an unknown object (i.e., not stored in the database) with sufficient information from the related objects (e.g., by transferring lighting or texture properties).

Figure 3:
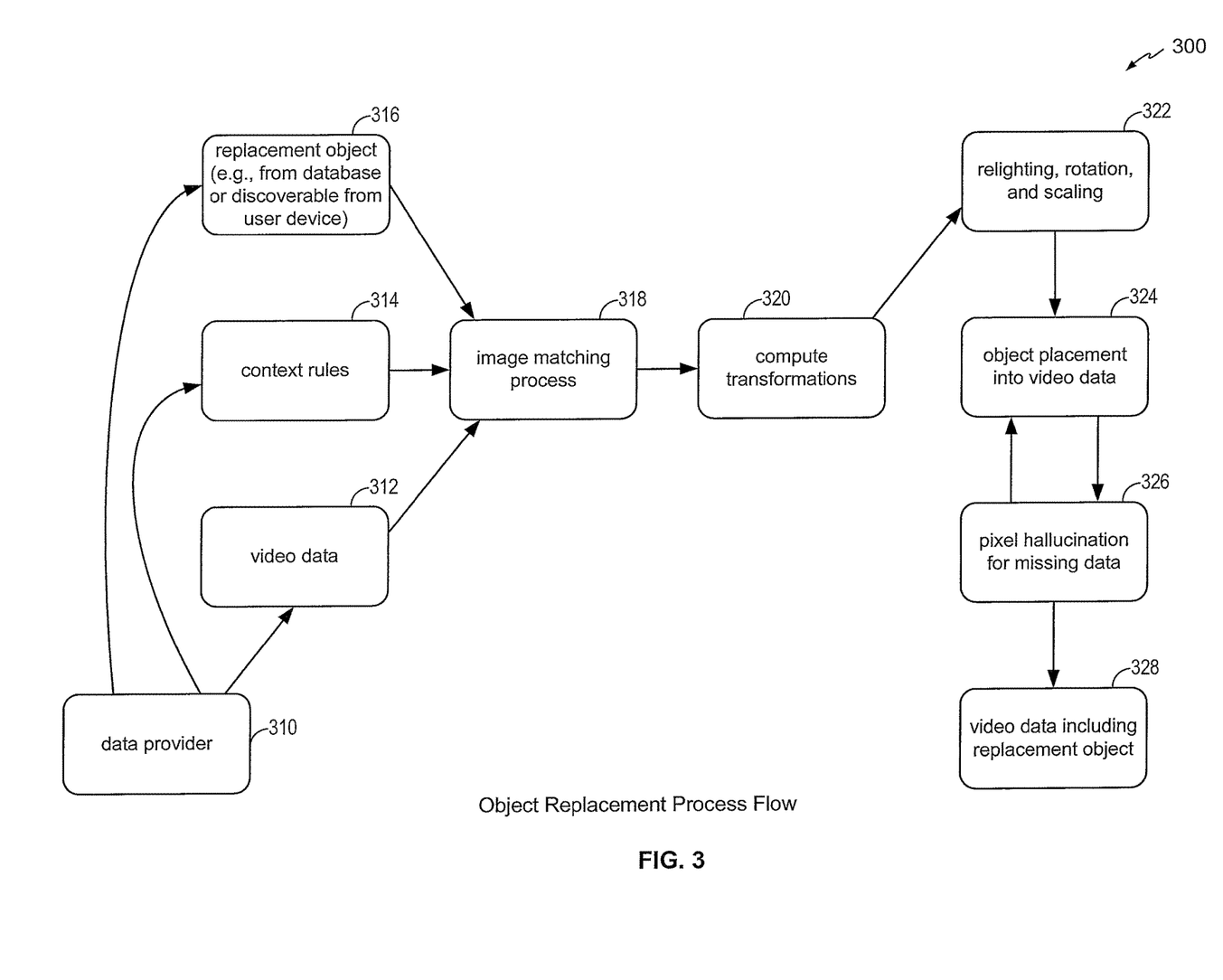
FIG. 3 is an object replacement process flow diagram of a method of operation of the system of FIG. 1 according to a particular embodiment.

Referring to FIG. 3, an object replacement process flow diagram of a method of operation of the system of FIG. 1 according to a particular embodiment is shown and generally designated 300. A data provider 310 may provide video data 312 during the object replacement process 300. The data provider 310 may be an advertiser or a content producer. The video data 312 may include moving pictures, still images, or any combination thereof. The data provider 310 may also provide a replacement object 316 from a database (e.g., the database 130 of FIG. 1 or the database 226 created during the object detection process 200 of FIG. 2). In a particular embodiment, the replacement object 316 may not exist in the database but may be discoverable or extracted from a user device (e.g., a mobile phone storing the user's photo album).

The data provider 310 may also provide context rules 314 for the replacement process 300. For example, the data provider 310 may specify conditions (e.g., if, when, and how) for replacing a source object in the video data 312 with the replacement object 316. To illustrate, the data provider 310 may specify audio or music requirements, video semantic requirements, lighting requirements, texture requirements, other visual requirements, or any combination thereof. The context rules may be any combination of logical statements (e.g., AND, NOT, OR), statistical priors (e.g., choose object A 50% of the time and object B 50% of the time to replace a specific source object), strict geometric constraints (e.g., a team flag should only be substituted in the top third of an image frame of the video data 312), or any combination thereof. Other context rules may be provided from a controlling system that may have external knowledge of demographic information (e.g., viewership age), scheduled transmission time of video data 312 or video stream consumption (e.g. primetime TV broadcast), or any combination thereof. For example, during post-production, context rules 314 provided by a data provider (e.g., a movie director) may specify that a main character's face (e.g., Tom Cruise) should replace a specific stunt double's face in scenes where the movie director wants the final output video to include the main character performing a particular stunt (i.e., in specific video frames).

The replacement object 316, the context rules 314, and the video data 312 may be provided to an image matching process, at 318. The image matching process 318 may match the replacement object 316 with the source object depicted in the video data 312. For example, the image matching process 318 may determine that a Bionic can (i.e., the replacement object) is to replace every instance of a Railway can (i.e., the source object) in the video data 312.

After the replacement object has been matched with the source object, the object replacement process 300 may include computing object and lighting transformations to extract the source object from the video data 312, at 320 and 322, and adding the replacement object into the video data 312, at 324. For example, computing the transformations may include adjusting lighting, shape, size, orientation, and texture conditions of the source object, the replacement object, or both.

Based on the context rules 314 and the computed transform parameters 320, the system 100 of FIG. 1 may utilize vision techniques to determine the source object's rotation and match the replacement object to it. Thus, the process 300 may include relighting, rotating, and scaling the replacement object to match the source object and to match the conditions of a current frame of the video data 312. To illustrate, the relighting, rotation, and scaling 322 may manipulate the replacement object to achieve a correct view angle of the replacement 3D model, scale the 3D model, and apply similar BRDF and texture to match the source object and to match the current frame lighting conditions before inserting the replacement object into the video data (i.e., before performing replacement).

The process 300 may include object placement 324 into the video data 312 (i.e., insertion) and performing pixel hallucination 326 for missing data. Insertion of the replacement object into the video data 312 may include removal of the source object from the video data 312 and insertion of the replacement object into the video data 312. Pixel hallucination 326 may include determining background pixels in a current frame from neighboring pixel data (e.g., a previous or a subsequent frame). An object insertion process (e.g., object placement 324) may receive feedback from the pixel hallucination process 326 to achieve smooth and well blended video frames of the video data 312. By performing relighting, scaling, and rotation 322, a reduction in the number of pixels to hallucinate may be achieved. Further, the object insertion process may be performed iteratively, where each iteration receives feedback from the pixel hallucination process 326 until all missing pixels have been hallucinated.

In a particular embodiment, methods for removing the source object may be dynamically adjusted based on the speed and quality requirements of the data provider 310. For example, one technique for removing the source object may be object masking (i.e., detecting relevant pixels and indicating that the detected pixels should take on background values). Another technique for removing the source object may be by seam carving. Seam carving may include picture analysis and reduction of energy intensity across vertical and horizontal image planes. In another particular embodiment, image masking may be used to remove the source object from the video data 312. Pixel masking may be used if the content provider's video data is destined for a lower resolution user device (e.g., mobile device). Seam carving may be utilized where the video data 312 is destined for use in a digital theatre or high-resolution entertainment system. It should be noted that the above are exemplary techniques for removing the source object from the video data 312 and other techniques may be implemented or used to remove the source object from the video data 312. The final output of the process 300 is the video data including the replacement object 328.

Figure 4:
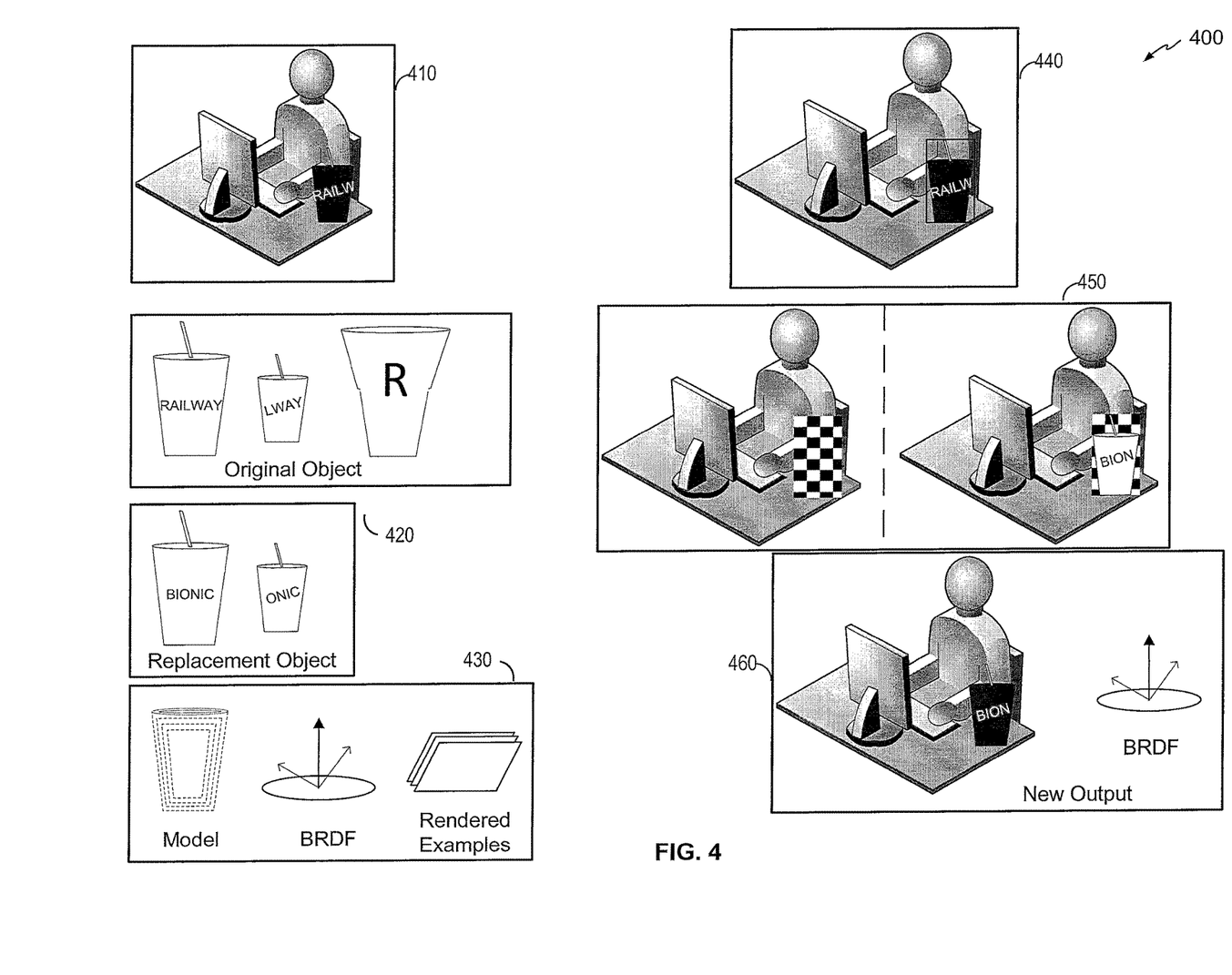
FIG. 4 is a diagram illustrating a particular embodiment of object replacement.

Referring to FIG. 4, a diagram illustrating a particular embodiment of object replacement is shown and generally designated 400. FIG. 4 includes six (6) views (i.e., 410-460) depicting examples of an object replacement process, such as the object replacement process that may be performed by the system of FIG. 1. A first view 410 shows original video content depicting a Railway cup. The original content in the first view 410 may be provided by a content provider (e.g., a Railway marketing department) or an advertiser (an advertising firm). Alternately, the original content may be automatically crawled from the internet or from a database that stores video content.

A second view 420 shows a plurality of views, shapes, sizes, and orientation (i.e., different images) of the original object (i.e., the Railway cup) depicted in the original content. The second view 420 also shows a plurality of views, shapes, sizes, and orientation (i.e., different images) of a replacement object (e.g., a Bionic cup). For example, it may be desirable to replace the Railway cup in the original content with the Bionic cup. In a particular embodiment, images of the Railway cup and the Bionic cup may be stored in a database (e.g., the database 130 of FIG. 1), may be provided by a content provider or an advertiser, may be automatically crawled (e.g., from the internet), or may be downloaded (e.g., from a user device such as a mobile device).

A third view 430 shows a generated 3D model of the Bionic cup and computed visual properties of the Bionic cup (e.g., BRDF). Although not shown, it should be noted that a 3D model of the Railway cup may also be generated and other visual properties of the Railway cup may be computed and stored to build a repository of objects and their corresponding visual properties.

A fourth view 440 shows identification of the Railway cup to be replaced in the original content. In addition, object matching rules (e.g., context rules) may be provided to the system 100 for replacing the Railway cup. For example, the system 100 may detect the Railway cup in a plurality of frames of the original content as shown in the fourth view 440. A search for the Railway cup may be implemented using computer-vision object search or other object search techniques.

A fifth view 450 shows removal of the Railway cup from the original content and insertion of the Bionic cup into the original content. In a particular embodiment, removal of the Railway cup from the original content may include computing lighting conditions of the Railway cup and surrounding objects and scenery in each video frame of the original content. For example, a first frame of the original content that includes the Railway cup may be dark and may include a shadow of the Railway cup while a second frame that includes the Railway cup may be lighter with no shadows. The fifth view 450 also shows the insertion of the Bionic cup into the original content to replace the Railway cup. In a particular embodiment, insertion of the Bionic cup into the original content may include manipulating the Bionic cup to an appropriate size to match a size of the removed Railway cup, manipulating an orientation of the Bionic cup to match an orientation of the removed Railway cup, other manipulations of visual properties of the Bionic cup to match the visual properties of the Railway cup, or any combination thereof. As shown in the fifth view 450, removal of the Railway cup and insertion of the Bionic cup into the original content may lead to missing pixels in the original content corresponding to either the original Railway cup, background or scene pixels, or even reflections of the cup in other parts of the frame, as depicted by the black and white checked boxes in the fifth view 450. Pixel hallucination may be performed to insert missing pixels into the original content.

A sixth view 460 shows a new video output generated after the removal and insertion processes described above. In the sixth view 460, the Bionic cup appears in the output video content. In a particular embodiment, generating the replacement output video content may include performing light-matching, blurring, and in-painting routines to smooth the replacement object (i.e., the Bionic cup) into the background scene. Further, as shown in the sixth view 460, the missing pixels in the fifth view 450 have been replaced (i.e., pixel hallucination has been performed).

Figure 5:
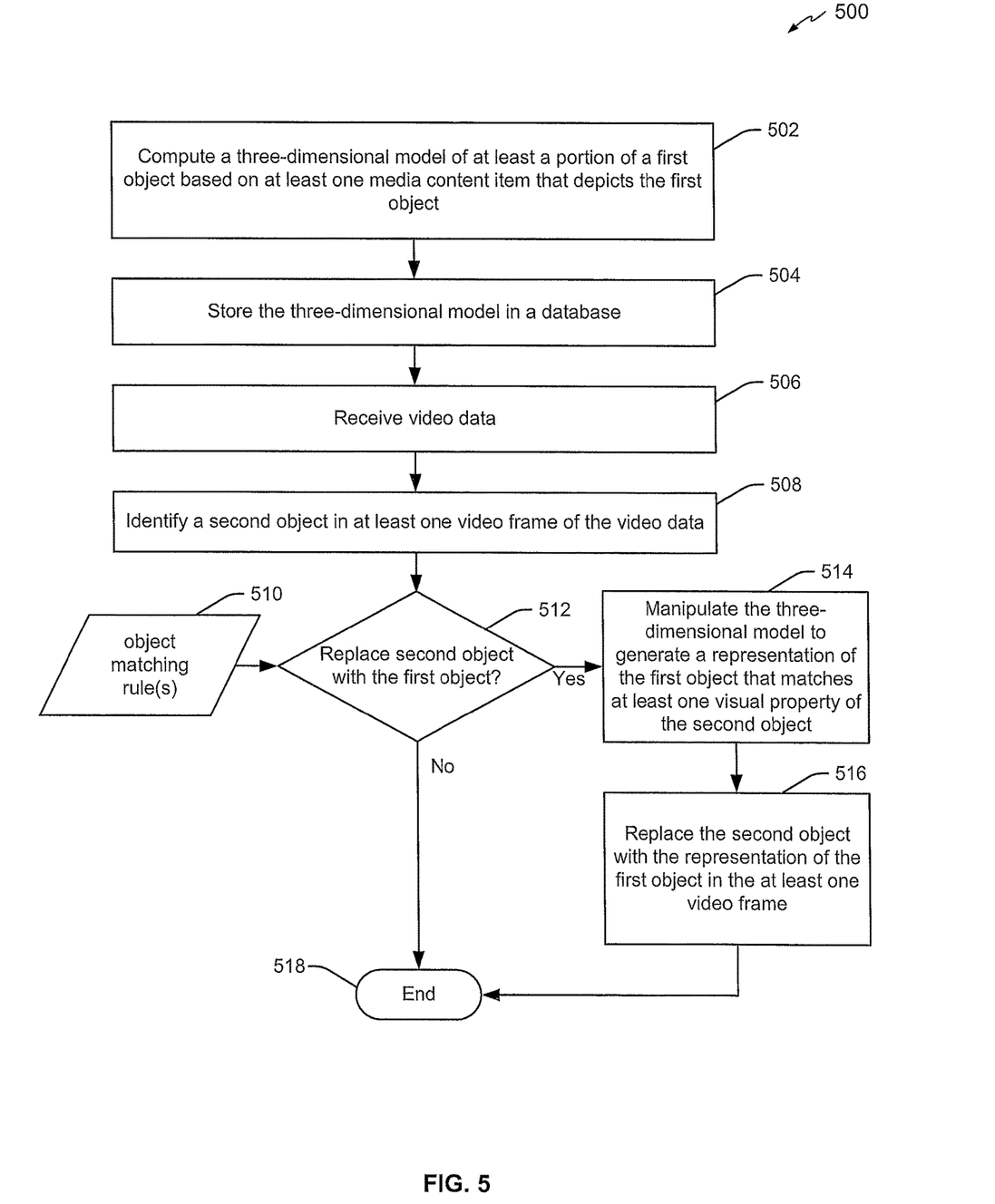
FIG. 5 is a flow diagram of a particular embodiment of a method of performing object replacement in images or video.

Referring to FIG. 5, a flow diagram of a particular embodiment of a method 500 of performing object replacement in images or video is illustrated. In an illustrative embodiment, the method 500 may be performed by the system 100 of FIG. 1.

The method 500 may include computing a three-dimensional (3D) model of at least a portion of a first object based on at least one media content item that depicts the first object, at 502, and storing the 3D model in a database, at 504. For example, the 3D model generator 120 of FIG. 1 may compute the 3D model 132 of the first object 112 depicted in the video content 110. The 3D model 132 of the first object 112 may be stored in the database 130.

The method 500 may also include receiving video data, at 506, and identifying a second object in at least one video frame of the video data, at 508. For example, the modification module 150 of FIG. 1 may receive the video data 160 that includes the second object 162, and the modification module 150 may identify the second object 162 in at least one video frame of the video data 160.

The method 500 may further include determining whether to replace the second object with the first object, at 512, based on at least one object matching rule 510. For example, the modification module 150 of FIG. 1 may receive one or more object matching rules from the object matching rules database 140 or from a user as user input 142. Further, the modification module 150 may determine whether to replace the second object 162 in the video data 160 with the first object 112.

In response to determining that the second object is to be replaced with the first object, at 512, the 3D model may be manipulated to generate a representation of the first object that matches at least one visual property of the second object, at 514, and the second object may be replaced with the representation of the first object in the at least one video frame, at 516. The method 500 may end, at 518. If it is determined that the second object is not to be replaced with the first object, at 512, the method may end, at 518. For example, the modification module 150 of FIG. 1 may manipulate the 3D model 132 of the first object 112 to generate a representation of the first object 112 that matches at least one visual property of the second object 162. To illustrate, the modification module 150 may manipulate the 3D model 132 by changing the size, color, texture, lighting, shading, BRDF, orientation, topology, or any combination thereof, of the 3D model 132 to generate a representation of the 3D model that matches a visual property of the second object 162. Manipulation of the 3D model 132 may be performed by the pre-replacement module 152 of the modification module 150. Further, the replacement module 154 of the modification module 150 may replace the second object 162 with the representation of the first object 112 generated by the pre-replacement module 152 in at least one video frame of the video data 160. The post-replacement module 156 of the modification module 150 may perform post-replacement processes including pixel hallucination for missing pixels, relighting, rotation, scaling, or any combination thereof, to generate a smooth and well blended video output.

Figure 6:
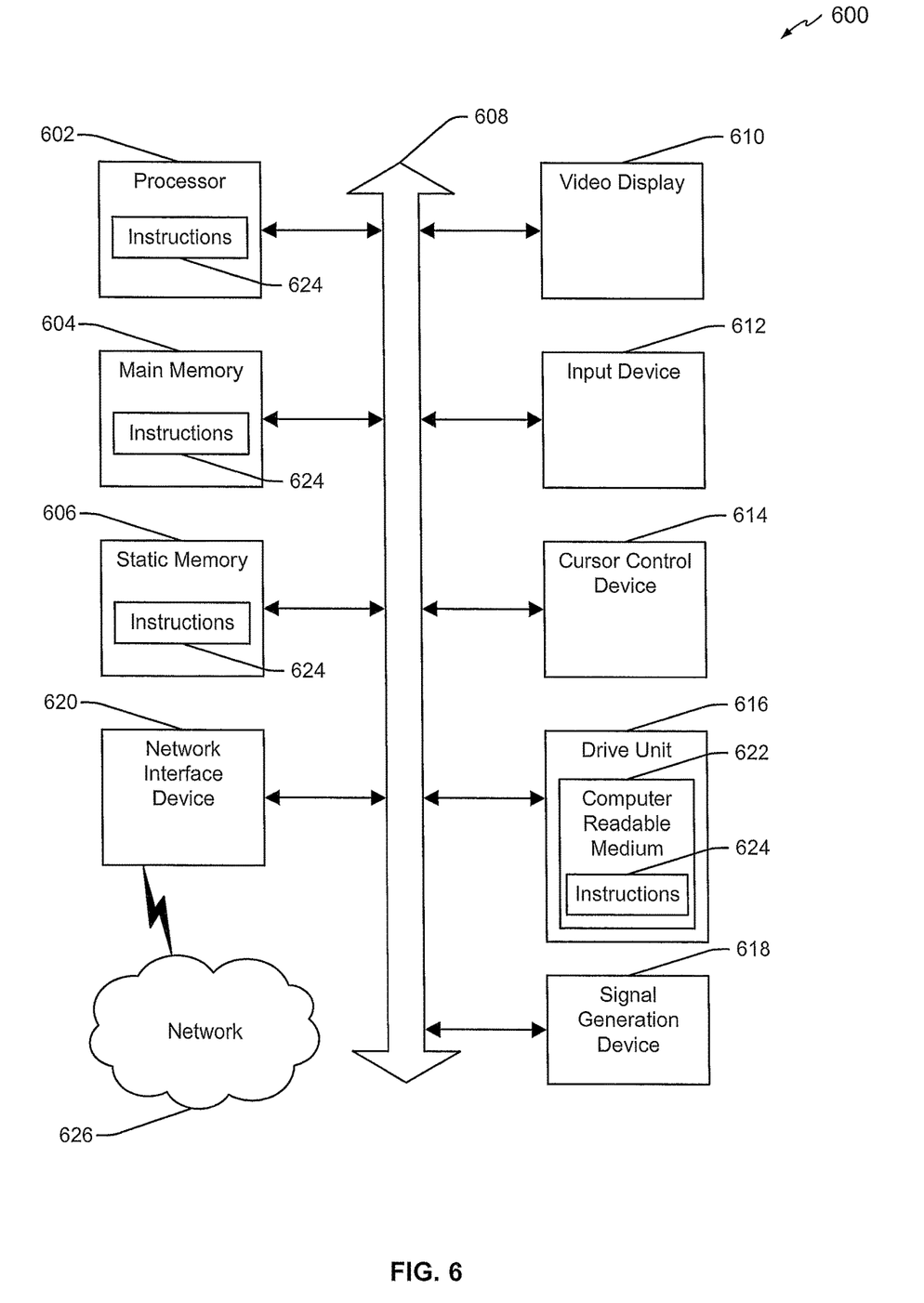
FIG. 6 is a block diagram of an illustrative embodiment of a computer system operable to support the various methods, systems, and computer-readable media disclosed with respect to FIGS. 1-5.

Referring to FIG. 6, an illustrative embodiment of a computer system is shown and designated 600. The computer system 600 may include a set of instructions that may be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 or portions thereof may implement, include, or be included within any one or more of the devices, modules, databases, and routines illustrated in FIGS. 1-5.

In a networked deployment, the computer system 600 may operate in the capacity of a server or as a client user computer in a server-client user network environment, or as a peer computer system in a distributed peer-to-peer or network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a personal trusted device, a web appliance, a network router, a switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or a combination thereof. Moreover, the computer system 600 may include a main memory 604 and a static memory 606 that may communicate with each other via a bus 608. As shown, the computer system 600 may further include a video display unit 610, such as a liquid crystal display (LCD), an organic light emitting diode (OLED), a flat panel display, or a solid state display. Additionally, the computer system 600 may include an input device 612, such as a keyboard, and a cursor control device 614, such as a mouse. Such input devices may enable interaction with various GUIs and GUI controls. The computer system 600 may also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods, routines, logic, or processes as described herein, such as the method described with reference to FIG. 5 or the process flow described with reference to FIGS. 2 and 3. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure illustrates a computer-readable medium that includes instructions 624 so that a device connected to a network 626 may communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any non-transitory medium that is capable of storing or encoding a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet, other packet switched network transmission (e.g., TCP/IP, UDP/IP, HTML, X10, SIP, TR-069, INSTEON, WEP, Wi-Fi and HTTP) and standards for viewing media content (e.g., MPEG and H.264) may represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
  receiving, at a computer system, video data of a video frame of video content;
  identifying, at the computer system, a first representation of a first object in the video frame to be replaced with a second representation of a second object, wherein the first representation is to be replaced based on absence of a visible feature in the first representation;
  manipulating, at the computer system, a three-dimensional model of the second object to generate the second representation, wherein the second representation includes the visible feature; and
  generating, at the computer system, a modified version of the video frame that includes the second representation in place of the first representation.

2. The method of claim 1, wherein generating the modified version of the video frame includes removing the first representation from the video frame.

3. The method of claim 2, wherein generating the modified version of the video frame further includes inserting the second representation to fill at least a portion of the video frame previously occupied by the first representation.

4. The method of claim 3, wherein generating the modified version of the video frame further comprises using pixel hallucination to fill a first portion of the video frame previously occupied by the first representation and not occupied by the second representation.

5. The method of claim 4, wherein pixels for the first portion are obtained from the video frame prior to removal of the first representation, a previous video frame of the video content, or a subsequent video frame of the video content.

6. The method of claim 1, wherein generating the modified version comprises:
determining that a reflection of the first object is present in another portion of the video frame; and
replacing the reflection of the first object with pixels corresponding to a reflection of the second object.

7. The method of claim 1, wherein manipulating the three-dimensional model of the second object includes adjusting a property of the three-dimensional model, the property including a color, size, shape, texture, lighting, shade, bi-directional reflectance distribution function, orientation, topology, or any combination thereof.

8. The method of claim 1, wherein manipulating the three-dimensional model of the second object comprises matching a particular visible feature of the second representation to match a corresponding visible feature of the first representation.

9. The method of claim 8, wherein the particular visible feature comprises a height of the second object, a width of the second object, a depth of the second object, or combinations thereof.

10. The method of claim 1, wherein the visible feature comprises at least a portion of a brand logo.

11. A system comprising:
a memory; and
a processor coupled to the memory, wherein the processor is configured to perform operations, the operations comprising:
receiving video data of a video frame of video content;
identifying a first representation of a first object in the video frame to be replaced with a second representation of a second object, the first representation to be replaced based on absence of a visible feature in the first representation;
manipulating a three-dimensional model of the second object to generate the second representation, wherein the second representation includes the visible feature; and
generating a modified version of the video frame that includes the second representation in place of the first representation.

12. The system of claim 11, wherein the processor is configured to:
extrapolate the three-dimensional model of the second object based on a media content item that depicts the second object; and
store the three-dimensional model in the memory.

13. The system of claim 12, wherein the media content item comprises a graphics file, a video file, or a combination thereof.

14. The system of claim 11, wherein manipulating the three-dimensional model includes rotating the three-dimensional model, changing a scale of the three-dimensional model, applying a texture to the three-dimensional model, or a combination thereof.

15. The system of claim 11, wherein the operations further comprise adjusting a bi-directional reflectance distribution function of the three-dimensional model to correspond to a particular bi-directional reflectance distribution function of the first representation.

16. A computer-readable storage device storing instructions that, when executed by a processor, cause the processor to perform operations, the operations comprising:
receiving video data of a video frame of video content;
identifying a first representation of a first object in the video frame to be replaced with a second representation of a second object, the first representation to be replaced based on absence of a visible feature in the first representation;
manipulating a three-dimensional model of the second object to generate the second representation, wherein the second representation includes a visible feature; and
generating a modified version of the video frame that includes the second representation in place of the first representation.

17. The computer-readable storage device of claim 16, wherein the operations further comprise:
computing the three-dimensional model of the second object based on a media content item that depicts the second object; and
storing the three-dimensional model in a memory.

18. The computer-readable storage device of claim 16, wherein the operations further comprise sending the modified version to a user device.

19. The computer-readable storage device of claim 18, wherein the user device comprises a set-top box device, a media device, a mobile device, a personal computer, or combinations thereof.

20. The computer-readable storage device of claim 16, wherein generating the modified version further comprises:
removing the first representation from the video frame; and
inserting the second representation to fill a portion of the video frame previously occupied by the first representation.

* * * * *